United States Patent [19]

Clayton et al.

[11] Patent Number: 4,957,574
[45] Date of Patent: Sep. 18, 1990

[54] TREAD CENTERING METHOD AND APPARATUS

[75] Inventors: Andrew R. Clayton, Salisbury, N.C.; Robert A. Cronin, Irvine, Calif.

[73] Assignee: The Goodyear Tire & Rubber Company, Akron, Ohio

[21] Appl. No.: 331,777

[22] Filed: Apr. 3, 1989

[51] Int. Cl.$^5$ .......................................... R29D 30/52
[52] U.S. Cl. ................................... 156/126; 156/96; 156/128.1; 156/406.2; 156/909
[58] Field of Search .................... 156/96, 128.1, 123, 156/130, 909, 394.1, 406.2, 405.1, 126, 127

[56] References Cited

U.S. PATENT DOCUMENTS

| | | | |
|---|---|---|---|
| 3,097,984 | 7/1963 | Godfrey, Jr. | 156/96 X |
| 3,397,099 | 8/1968 | Barefoot | 156/96 |
| 3,815,651 | 6/1974 | Neal | 152/187 |
| 3,923,390 | 12/1975 | Susko | 353/95 |
| 3,976,532 | 8/1976 | Barefoot | 156/96 X |
| 4,036,677 | 7/1977 | Marangoni | 156/394.1 |
| 4,088,521 | 5/1978 | Neal | 156/96 |
| 4,106,965 | 8/1978 | Lee | 156/123 |
| 4,626,300 | 12/1986 | Barefoot | 156/96 |
| 4,820,373 | 4/1989 | Klose | 156/128.1 |

Primary Examiner—Michael W. Ball
Assistant Examiner—Geoffrey L. Knable
Attorney, Agent, or Firm—David L. King

[57] ABSTRACT

A method and apparatus for centering an annular tread on a pneumatic tire-casing is described. The method, preferably put into use with the apparatus, comprises mounting a casing on a wheel, locating the equatorial plane of the casing or wheel, mounting the annular tread on an axially-moveable tread expander assembly, and positioning the tread on the tread expander assembly such that its circumferential center line is located a fixed distance from and parallel to the equatorial plane of the casing or wheel. The distance between the annular tread and the casing or wheel is reduced by an amount equal to the fixed distance so that the annular tread encircles the casing and the circumferential centerline of the tread becomes coincident with the equatorial plane of the casing or wheel.

17 Claims, 7 Drawing Sheets

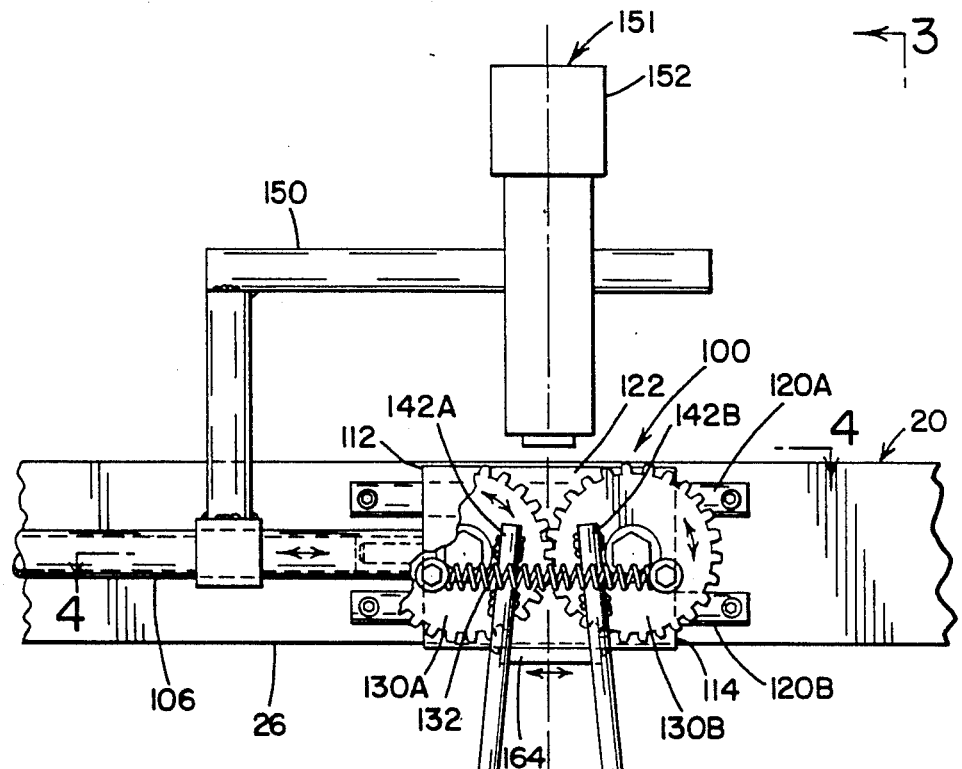
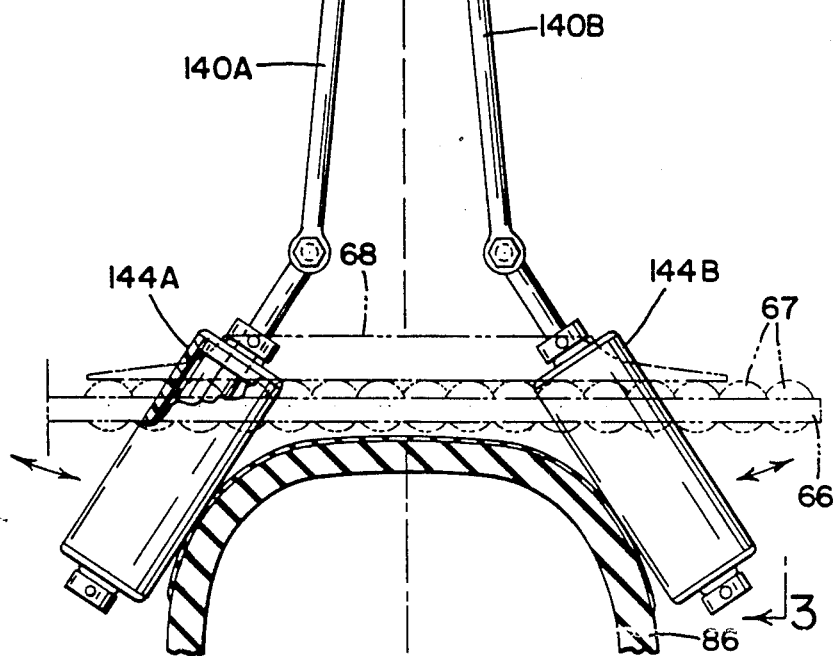
FIG. 2

TREAD CENTERING METHOD AND APPARATUS

BACKGROUND OF THE INVENTION

1. Field of Invention

The present invention relates generally to methods and apparatuses for applying an endless, annular tread to a tire casing, and more specifically to a method and an apparatus capable of accurately centering such annular tread on such casing.

2. Description of the Related Art

An endless, annular tread similar to the type utilized in the present invention is disclosed in U.S. Pat. No. 3,815,651 to Neal. An annular tread as disclosed in Neal is endless, i.e. the circle of the tread is unbroken. A second patent issued to Neal, U.S. Pat. No. 4,088,521, discloses another annular tread which features shoulder wings.

Annular treads, such as these disclosed in the Neal Patents, have a relaxed diameter less than the inflated diameter of the tire casing. The annular treads must be stretched radially outwardly to be fitted over the tire casing. Machinery directed to this process is disclosed in U.S. Pat. No. 3,976,532 to Barefoot and U.S. Pat. No. 4,036,677 to Marangoni. The operation of the machine disclosed in FIG. 1 is similar to the machine disclosed in U.S. Pat. No. 3,976,532 to Barefoot. Details of elements of the tread-applying machine disclosed in FIG. 1 which are not essential to the present invention have been only briefly discussed. Additional information regarding the operation of such machines may be found in the Barefoot Patent.

In order to achieve good tire performance, it is important that the annular tread be accurately centered on the tire casing. The present invention is an apparatus and a method for locating the equatorial plane of a tire casing or wheel and accurately positioning an annular tread on the casing.

SUMMARY OF THE INVENTION

A method for centering an annular tread on a pneumatic tire casing according to the present invention comprises mounting a casing on a wheel, locating the equatorial plane of the casing or wheel, mounting the annular tread on an axially moveable tread expander assembly, and positioning the tread on the tread expander assembly, such that the circumferential centerline of the tread is located a fixed axial distance from and parallel to the equatorial plane of the casing or wheel. The distance between the annular tread and the casing or wheel is reduced by an amount equal to the fixed axial distance. The movement in the axial direction is equal to the fixed axial distance between the circumferential centerline of the tread and the equatorial plane of the casing. This movement results in the annular tread encircling the casing such that the circumferential centerline of the tread is coincident with the equatorial plane of the casing or wheel.

The method described above may be carried out in association with an apparatus comprising a wheel and a tread expander assembly mounted on a frame, the wheel being adapted for receiving and mounting a casing and the tread expander assembly being slidably mounted with respect t the frame and adapted for receiving and mounting an annular tread. The apparatus includes a means for establishing the location of a first plane parallel to the equatorial plane of the casing or wheel and a means for determining the axial location of the equatorial plane of the casing. The equatorial plane of the casing is located a fixed axial distance relative to the first plane parallel to the equatorial plane of the casing. A means for providing relative axial movement between a casing mounted on the wheel and tread mounted on the thread expander assembly is provided to bring the centerplane of the tread and the equatorial plane of the casing into coincidence, the relative movement in the axial distance being equal to the fixed axial distance.

BRIEF DESCRIPTIONS OF THE DRAWINGS

Other aspects of the invention will become apparent from the following description when read in conjunction with the accompanying drawings wherein:

FIG. 2 is an enlarged front view of a portion of the centering apparatus of the present invention;

DETAILED DESCRIPTION OF THE PREFERRED EMBODIMENT

The invention also may be better understood in the context of the following definitions, which are applicable to both these specification and the appended claims.

"Axial" is used herein to refer to lines or directions that are parallel to the axis of rotation of the casing or wheel.

"Bead" means that part of the casing comprising an annular tensile member wrapped by ply cords and shaped, with or without other reinforcement elements such as flippers, chippers, apexes, toe guards and chafers, to fit the design rim.

"Casing" means the carcass, belt structure, beads, sidewalls, and all other components of the tire excepting the tread and undertread. The casing may be new, unvulcanized rubber or previously vulcanized rubber to be fitted with a new tread.

"Equatorial plane (EP)" means the plane perpendicular to the axis of rotation of the casing or wheel and passing through the center of the crown area of the casing.

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Radial" and "radially" are used to mean directions radially toward or away from the axis of rotation of the casing or wheel.

"Sidewall" means that portion of a tire between the tread and the bead.

"Tread" means a molded rubber component which, when bonded to a tire casing, includes that portion of the tire that comes into contact with the road when the tire is normally inflated and under normal load.

"Tread width" means the arc length of the tread surface in the axial direction, that is, in a plane passing through the axis of rotation of the tire.

Figure 1:
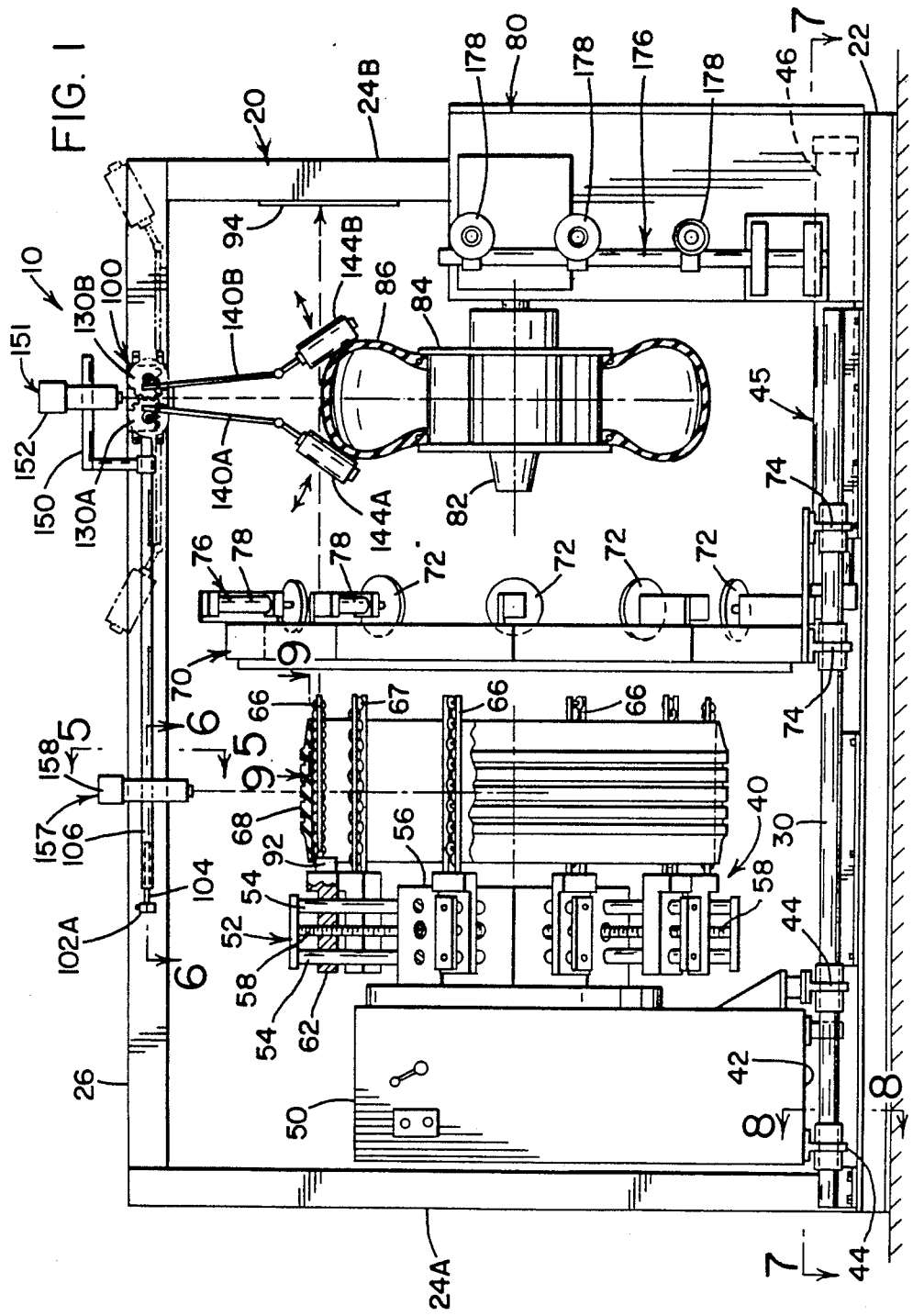
FIG. 1 is a front view of a machine for applying an annular tread to a tire casing.

In the drawings, the same numerals are used for the same components or items in the several views. With particular reference now to FIG. 1 there is illustrated a tread applying machine 10. This tread applying machine is made up of several subcomponents or elements. These elements are supported by a frame 20. The frame may be constructed of any material with sufficient strength and rigidity to support the weight and operation of the tread applying machine.

Figure 3:
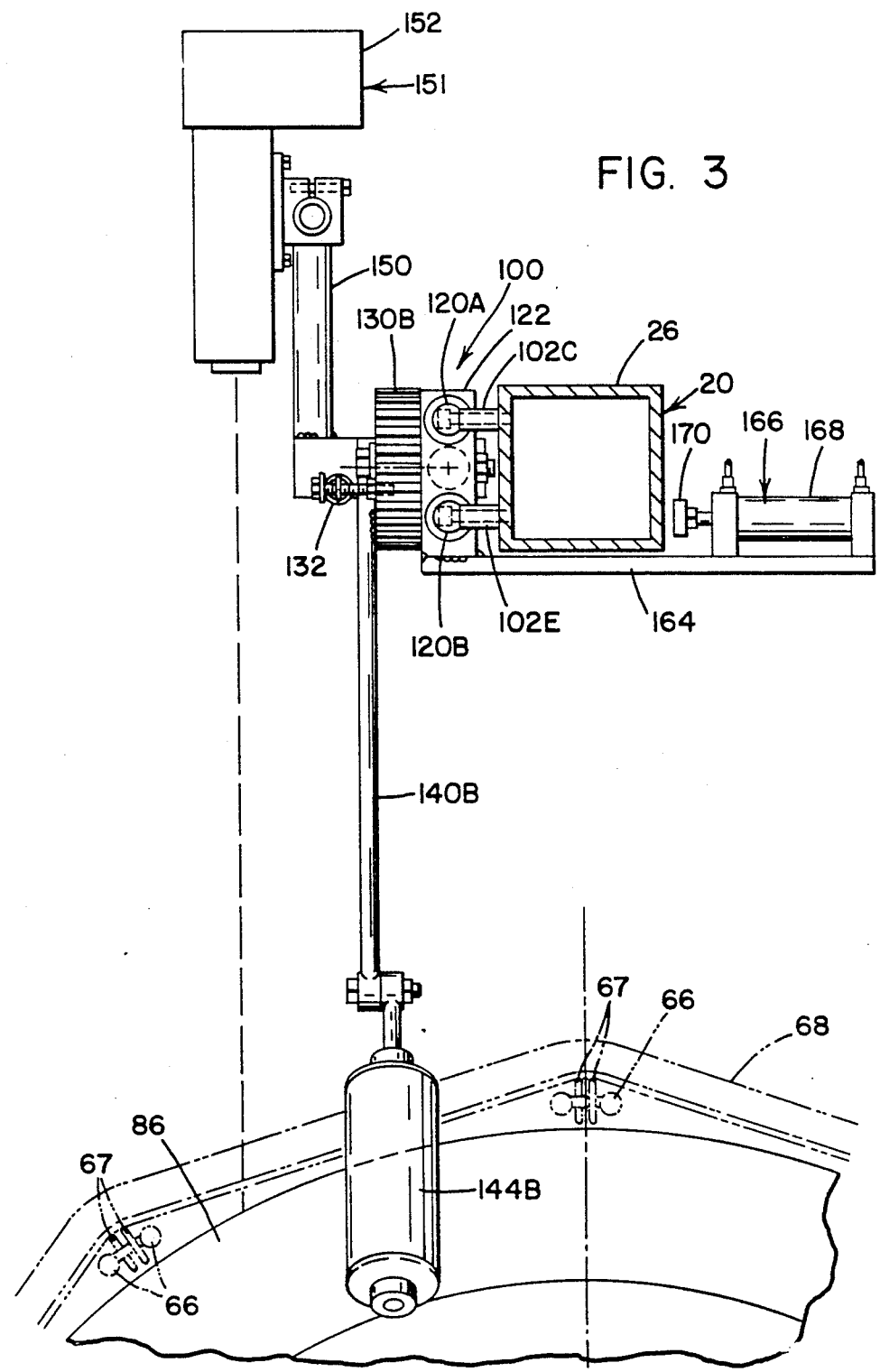
FIG. 3 is a side cross-sectional view of the apparatus taken on line 3—3 of FIG. 2.

In the preferred embodiment, the frame comprises a horizontal base 22, a pair of vertical side members 24A, 24B fixedly attached to the horizontal base member, and a horizontal top member 26, each end of which is fixedly attached to the vertical side members. In the preferred embodiment, the frame consists of tubular steel members of square cross-section as seen in FIG. 3.

Figure 7:
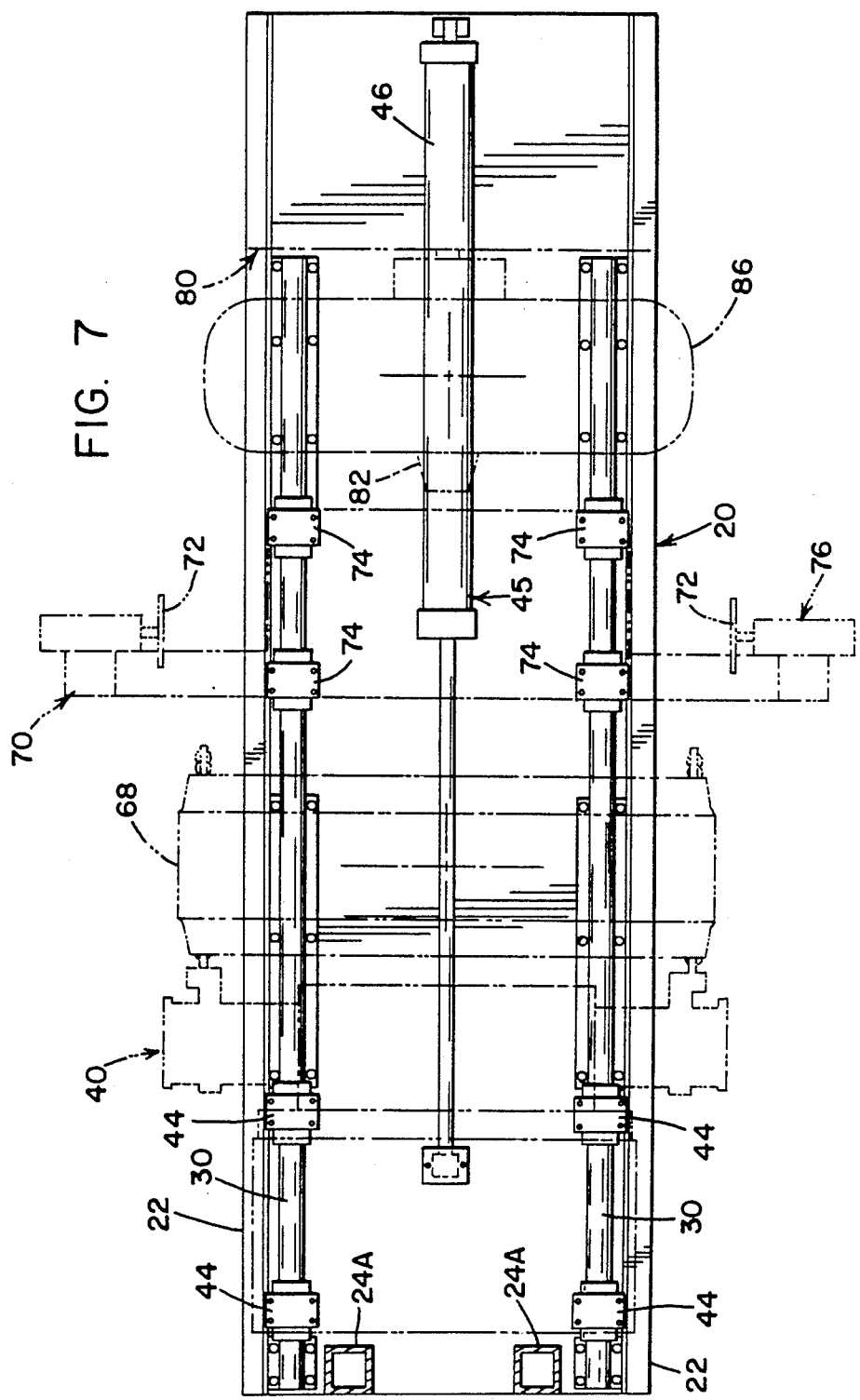
FIG. 7 is a cross-sectional plan view taken on line 7—7 of FIG. 1 with some elements of the machine removed so as to better show the base of the frame and the guide rails.
Figure 8:
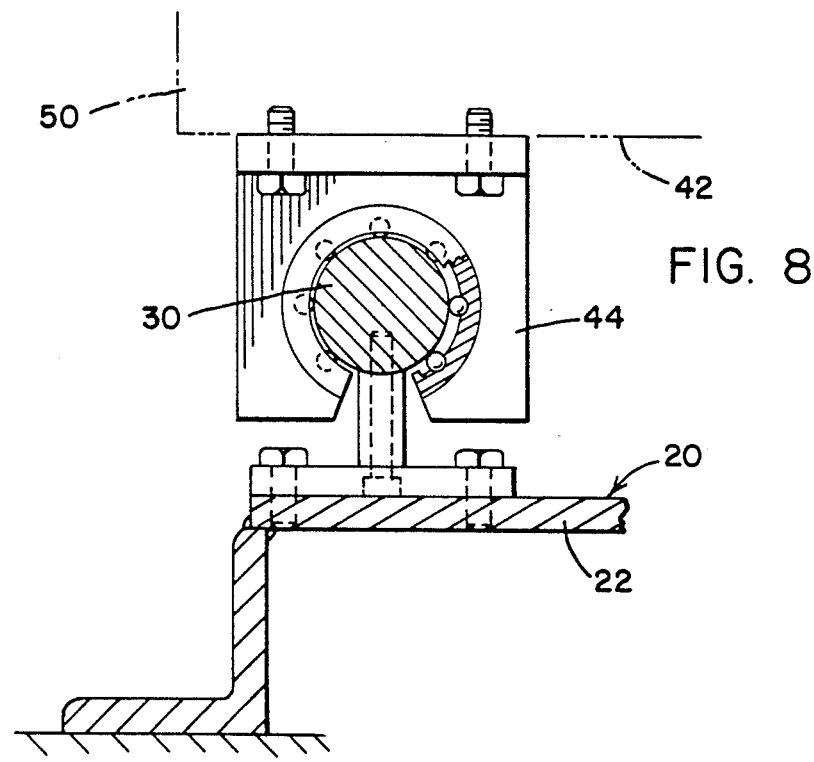
FIG. 8 is a cross-sectional side view of the frame and the guide rails taken on line 8—8 of FIG. 1.
Figure 9:
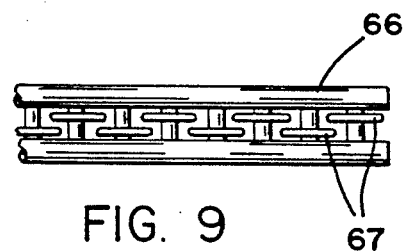
FIG. 9 is a plan view of the wheels on the fingers taken on line 9—9 of FIG. 1.

With the reference to FIG. 7 and FIG. 8, a pair of guide bars 30 are fixedly attached to the horizontal base 22. Some elements of the tread applying machine which will be discussed later in this specification are slidably mounted on the guide bars.

With reference to FIG. 1, one of these elements, the tread expander assembly, generally indicated by the reference number 40, is slidably mounted for lateral movement along the guide bars 30. The tread expander assembly acts as a supporting device on which to mount the annular tread 68. The tread expander assembly includes a bottom plate 42 which has bearing members 44 downwardly depending from it. As seen best in FIG. 7 and FIG. 8, the bearing members receive the guide bars 30. A means to provide lateral movement 45 is mounted on the base 22 and is connected to the bottom plate of the tread expander assembly. The means to provide lateral movement enables the tread assembly to move axially along the guide bars. In the preferred embodiment, the means to provide lateral movement is a hydraulic cylinder 46.

With reference to FIG. 1, a first cabinet 50 rises from the bottom plate 42 and contains supporting means and means to provide rotational movement, not shown. A shaft, not shown, is mounted on the supporting means and is connected to the means to provide rotational movement. The head assembly 52 is mounted on the shaft. The means to provide rotational movement may selectively turn the shaft and thereby the head assembly.

With reference to FIG. 1, the head assembly 52 has a hub 56 from which extend radially outwardly a plurality of pairs of radially-extending rods 54. A threaded shaft 58 is positioned between pairs of radially extending rods. A supporting plate 62 receives the radially extending rods and has a threaded bore which receives the threaded shaft 58. Through an electric motor and bevel gear arrangement not shown, the threaded shafts may selectively provide radial movement to the supporting plates.

With reference to FIG. 1, FIG. 2, FIG. 3 and FIG. 9, fingers 66 are fixedly mounted to the supporting plate 62 and support the annular tread 68. The fingers feature wheels 67 which allow the stretched tread to be more easily removed from the fingers. In the preferred embodiment, the wheels are slightly offset from the centerline of the fingers radially outwardly toward the casing. This prevents the axially outermost edges of the tread from contacting the finger. By keeping the tread edges on the wheels, the edges are prevented from tucking under and trapping air under the tread. Through the gearing arrangement not shown, the threaded shafts can move the supporting plates 62 and fingers 66 radially outward, thereby stretching the annular tread 68. Alternatively, the gearing arrangement, through the threaded shafts, may radially retract the supporting plates and fingers and thereby relax the annular tread. The amount of radial travel by the fingers, and thereby the amount of stretching of the tread, is regulated by a photo eye 92 and reflective tape 94. The photo eye and reflective tape are positioned so that light emitting from the photo eye can be reflected as soon as the annular tread is stretched sufficiently to encircle the casing. In such case, the reflected light enters the photo eye and signals the electric motor to stop, thereby halting the radial movement of the fingers.

With reference to FIG. 1, a clamping means 70 is slidably mounted on the guide bars 30. The clamping means features pads 72. The pads are arranged radially around the clamping means and are attached to means to provide linear movement 76. In the preferred embodiment, the means to provide linear movement is a plurality of pneumatic cylinders 78. The clamping means is slidably mounted on the guide bar via bearing members 74.

A second cabinet 80 contains a supporting means and a means to provide rotational movement. A hub 82 is supported by the supporting means and is selectively rotated by the means to provide rotational movement. The hub 82 is adapted to receive and mount a wheel 84 which in turn is adapted to receive a tire casing 86. In the preferred embodiment, the hub 82 is adapted to receive a variety of wheel sizes.

Figure 4:
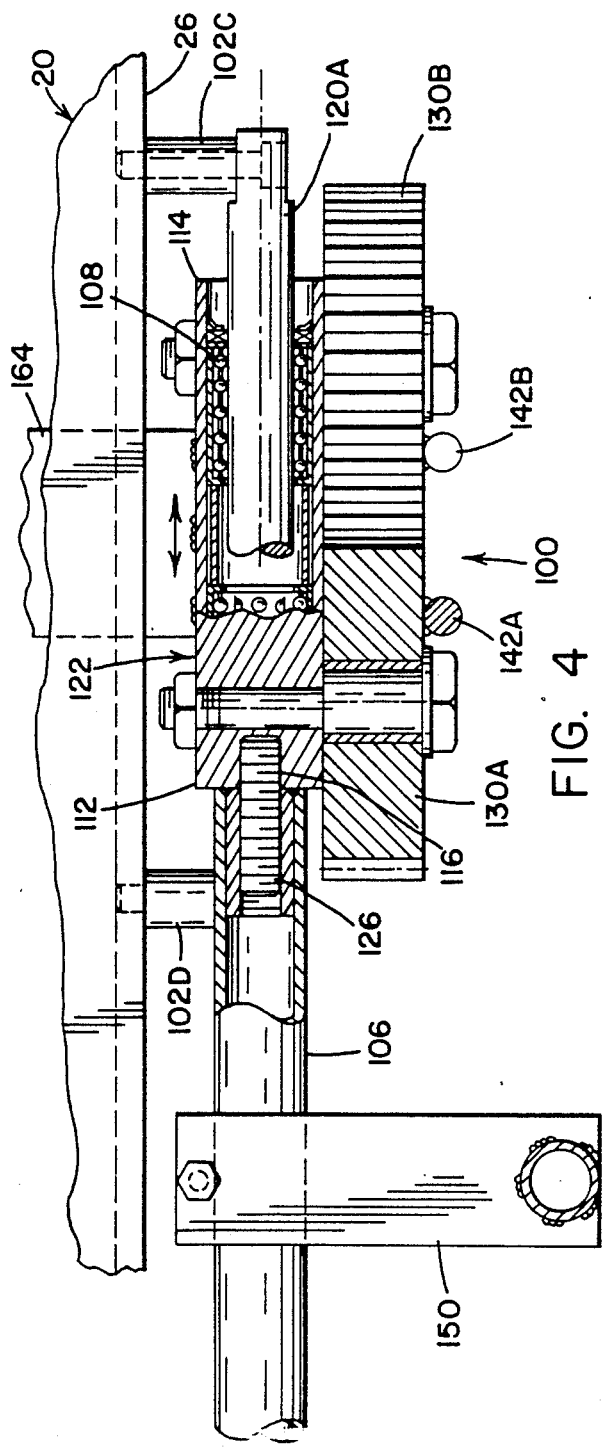
FIG. 4 is a further enlarged cross-sectional plan view of the apparatus taken on line 4—4 of FIG. 2.
Figure 5:
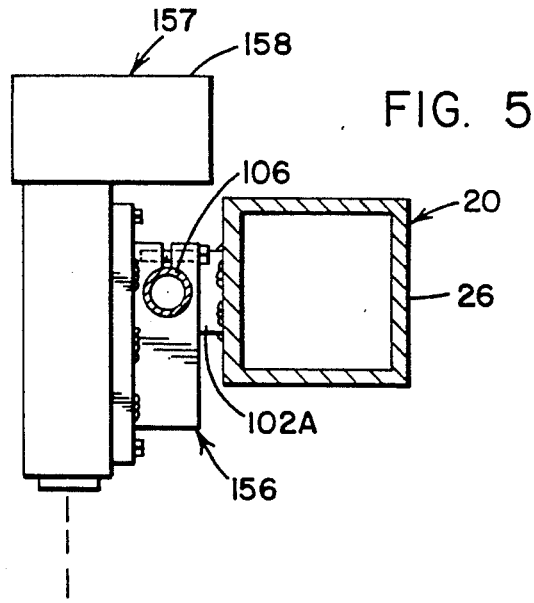
FIG. 5 is a side cross-sectional view of a portion of the apparatus taken on line 5—5 of FIG. 1.
Figure 6:
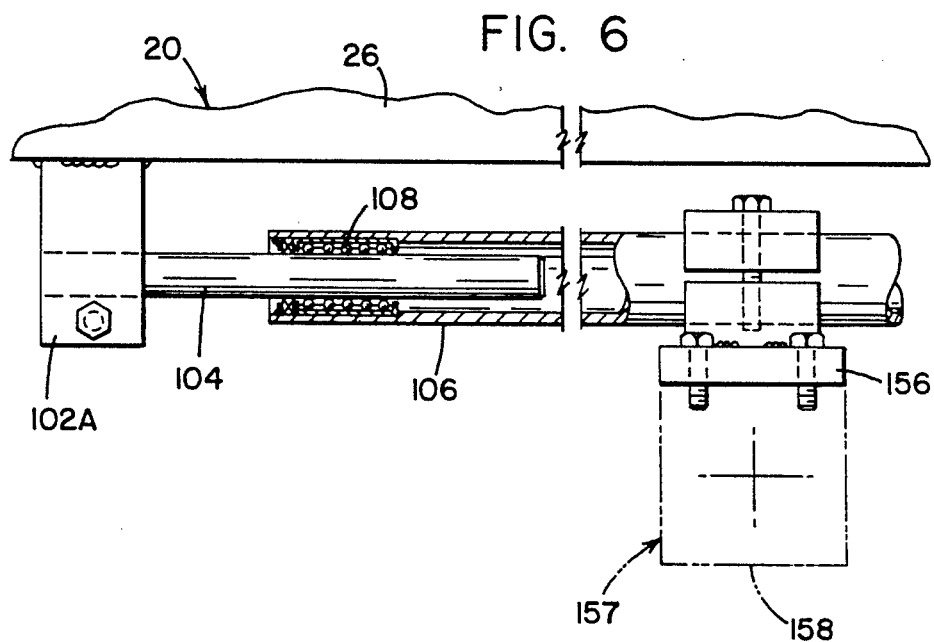
FIG. 6 is a plan cross-sectional view of another aspect of the centering apparatus of the present invention taken on line 6—6 of FIG. 1.

With reference to FIGS. 1 through 6, a tread centering assembly 100 is mounted on the horizontal top member 26 via braces 102A-E. With reference to FIG. 6, a rod 104 is attached to brace 102A and extends axially therefrom in a direction generally parallel to the horizontal top member 26. A first end of an inextensible sliding rod 106 fits over the rod 104 and is slidably supported thereby via bearings 108.

As seen best in FIG. 3 and FIG. 4, the braces 102B-E are located near the second end of the inextensible sliding rod 106. Brace 102B is fixedly attached to the first end of supporting rod 120A. Brace 102C is fixedly attached to the second end of supporting rod 120A. Likewise, brace 102D is fixedly attached to first end of supporting rod 120B and brace 102E is fixedly attached to the second end of supporting rod 120B.

A plate 122 has a pair of bores through it and is adapted to receive supporting rods 120A, 120B. With reference to FIG. 4, a first end 112 of the plate 122 has a threaded bore 116 adapted to receive one end of a threaded rod 126. The other end of the threaded rod is attached to the second end of the sliding rod 106. Through this threaded connection, the sliding rod and plate move as a unit.

The range of lateral sliding movement is equal to the distance between braces 102B and 102C, minus the lateral distance between the first end 112 and the second end 114 of the plate 122. Lateral movement is stopped when first end 112 of the plate 122 touches braces 102B, 102D and when second end 114 of the plate touches braces 102C, 102E.

With the reference to FIG. 2, a pair of intermeshed circular gears 130A, 130B are rotatably mounted to plate 122. An off-center spring 132 extends between the gears and is attached to them. A pair of axially-spreadable arms 140A, 140B extends downwardly from each gear toward the casing. Each first end 142A, 142B of the arms is attached to a gear. At the second end of each arm is mounted a roller 144A, 144B. With reference to FIG. 1, the arms move between a first position, in which they extend downwardly toward the casing, and a second position, in which the arms are locked into position when approximately parallel to horizontal top member 26.

With reference to FIG. 3, a plate 164 is attached preferably by welding, to plate 122. A means to prohibit lateral sliding movement 166 is mounted on plate 164. In the preferred embodiment, this means is a pneumatic cylinder 168 and piston 170. When the cylinder is activated, the piston extends and contacts the horizontal top member 26. The friction between the piston and the horizontal top member prohibits sliding movement.

With reference to FIG. 2, a first bracket 150 is fixedly mounted to sliding rod 106. A means to project a marking medium 151 is attached to the first bracket 150. In a preferred embodiment, the means to project a marking medium is a centerline light 152.

With reference to FIG. 5, a second bracket 156 is fixedly mounted to the sliding rod 106. A second means to project a marking medium 157 is mounted on the second bracket 156. In the preferred embodiment, the second means to project a marking medium is a second centerline light 158.

With reference to FIG. 1, a let-off 176 is mounted on the base 22. The let-off has a plurality of spools 178 which may let-off or windup sheets of material such as unvulcanized rubber.

The components herein recited work together to locate the center of a tire casing in the following manner.

A casing 86 is mounted on an appropriate wheel 84. In the case of a previously vulcanized casing, the surface of the casing has already been buffed and prepared appropriately and a thin layer of unvulcanized rubber is manually applied to the surface of the casing via the let-off 176. Next the casing is partially inflated to about 18 psi.

The arms 140A, 140B and rollers 144A, 144B are brought down to their first position with the rollers touching the edges of the crown of the casing. At this time the piston 170 is not contacting the horizontal top member 26, therefore, the tread centering assembly 100 is free to slide axially via the sliding rod 106. When the arms touch the casing at corresponding points of the surface on opposite sides of the equatorial plane, the first centerline light 152 is coincident with the equatorial plane of the casing. At this point the cylinder 168 is activated so that the piston 170 contacts the horizontal top member 26 and prohibits sliding movement of the sliding rod 106. The arms 140A, 140B and the rollers 144A, 144B are next manually moved to the second position where the arms are approximately parallel with the horizontal top member 26. This is best seen in FIG. 1.

The second centerline light 158 is mounted on the sliding rod 106 so that the plane defined by light emitting from the second centerline light is parallel to the equatorial plane of the casing and is located a specific distance from it. This specific distance is exactly equal to the travel of the hydraulic cylinder 46. Therefore, when the tread centerline is coincident with the light emitting from second centerline light 158, the tread centerline is also parallel to the equatorial plane of casing 86 and is located a specific distance from it. An annular tread 68 is mounted on the relaxed fingers 66. The tread is approximately centered under the second centerline light 158. The head assembly 52 is rotated slowly and the tread centerline is manually axially adjusted to coincide with the light projected from the second centerline light. Next the gear arrangement not shown causes the threaded shafts to rotate, moving the fingers radially outwardly. This stretches the annular tread and inhibits lateral movement of the tread on the fingers. The fingers move radially outwardly until light from the photo eye 92 reflects from the reflective tape 94. At this point, the tread has been sufficiently stretched to encircle the casing.

The hydraulic cylinder 46 is activated so that the tread expander assembly 40 is pulled toward the casing 86. The tread expander assembly pushes the clamping means 70 ahead of it. When the tread expander assembly 40 has traveled the full stroke of the hydraulic cylinder 46, the tread 68 on the fingers 66 encircles the casing 86. This is seen best in FIGS. 2 and 3. Furthermore, the clamping means 70 encircles the tread 68. The tread is now perfectly centered over the crown-area of the casing. If desired, the light emitting from first centerline light 152 provides a check and should fall coincident on the tread centerline.

The fingers 66 are now moved radially inwardly, relaxing the tread slightly. The pads 72 of the clamping means 70 to travel radially inwardly, pushing on the radially outermost surface of the tread and pushing the annular tread against the unvulcanized rubber on the casing surface. Next the pads are retracted. If desired, the pads may be activated again. Next the hydraulic cylinder 46 is again activated, causing the tread expander assembly 40 to withdraw axially, transferring the tread to the casing by allowing it to roll off the fingers 66 via wheels 67. The clamping means 70 is withdrawn. Finally, the annular tread 68 is stitched down onto the casing surface. The stitching mechanism is not shown.

Based on the foregoing description of the invention, what is claimed is:

1. A method for centering an annular tread on a pneumatic tire casing, the method comprising the steps of:
   determining the location of the equatorial plane of the casing or the wheel;
   mounting the annular tread on a tread expander assembly;
   establishing a first plane location axially spaced a fixed distance from and parallel to the equatorial plane of the casing or wheel;
   positioning the tread on the tread expander assembly such that the circumferential centerline of the tread is coincident with said established first plane;
   expanding the tread as required to permit the tread to encircle the casing; and
   providing relative axial movement between said tread expander and a casing mounted on said wheel to bring the centerline of said tread and the equatorial plane of said casing mounted on said wheel into coincidence, said relative axial movement being a fixed distance equal to the fixed distance between said established first plane and the determined equatorial plane of a casing mounted on said wheel.

2. A method for centering an annular tread on a pneumatic tire casing as in claim 1, wherein the step of establishing the first plane location includes the steps of:
projecting a marking medium, the projected marking medium being parallel to the equatorial plane of the casing or wheel and at the fixed axial distance from the equatorial plane of the casing or wheel.

3. A method for centering an annular tread on a pneumatic tire casing as in claim 2 wherein the step of positioning the centerline of the annular tread includes:
expanding the tread expander assembly thus stretching the annular tread slightly; and
aligning the circumferential centerline of the annular tread with the marking medium by manually tapping the sides of the tread and disposing is axially.

4. A method according to claim 1, wherein the relative axial movement is provided by axially moving the tread expander assembly relative to the casing.

5. A method for centering an annular tread on a pneumatic tire as in claim 4, further comprising the steps of:
verifying that the tread centerline is in concentric alignment with the casing equatorial plane; and
adjusting the fixed axial distance between the established first plane and the determined equatorial plane of the casing or the wheel to equal the distance of fixed axial travel of the tread expander assembly.

6. An apparatus for centering an annular tread on a casing having an equatorial plane, the apparatus comprising:
a frame;
a wheel mounted on the frame and adapted for receiving and mounting a casing;
a tread expander adapted for receiving an annular tread at a location axially spaced from said wheel;
means for determining the axial location of the equatorial plane of a casing mounted on said wheel;
means for establishing a first plane location axially spaced a fixed distance from and parallel to the equatorial plane of the casing or wheel;
means for providing relative axial movement between said tread expander and a casing mounted on said wheel to bring the circumferential centerline of a tread into coincidence with the equatorial plane of the casing, said tread being positioned on the tread expander assembly such that the circumferential centerline is coincident with said established first plane prior to relative axial movement, said relative axial movement being a fixed distance equal to the fixed distance between said established first plane and the determined equatorial plane of a casing mounted on said wheel.

7. An apparatus as in claim 6 wherein the tread expander assembly is axially moveable.

8. An apparatus as in claim 6, further including a member mounted on the frame, the means for establishing the location of the first plane and the means for determining the location of the equatorial plane of the casing being attached to the member.

9. An apparatus for centering an annular tread on a casing as in claim 8, wherein the member and the respective means for establishing the location of the first plane and determining the equatorial plane are axially moveable.

10. An apparatus for centering an annular tread on a casing as in claim 9, further comprising:
means for selectively preventing axial movement of the member and the respective means attached to such member.

11. An apparatus for centering an annular tread on a casing as in claim 10 wherein the means for determining the equatorial plane of the casing or wheel comprises:
a pair of axially spreadable arms, each arm having first and second ends, each first end of an arm being pivotably connected to the member and each second end extending toward the casing, the distance between the first end of an arm and the second end of an arm being the same for each arm, each arm selectively engaging the casing at points equidistant from the axis of rotation of the casing.

12. An apparatus for centering an annular tread on a casing as in claim 11 wherein the means for determining the equatorial plane of the casing or wheel comprises:
a gear housing mounted on the frame;
a pair of lockable, intermeshed gears in the housing; and
wherein the axially-spreadable arms extend from the gears toward the casing, the gears forming the respective pivotal connections to the member, the axial spreading movement of one arm causing an equal and opposite movement of the other arm through the intermeshed gears.

13. An apparatus for centering an annular tread on a casing as in claim 8 wherein the member comprises:
a first and second brace extending perpendicularly from the frame;
first and second rods, the first rod being attached to the first brace and extending toward the second rod, the second rod being attached to the second brace and extending toward the first rod;
a pair of ball-bearings, one of the ball-bearings extending circumferentially about the circumference of each rod;
a hollow rod having first and second ends, the first end of the hollow rod extending circumferentially about the first rod and ball-bearings and the second end of the hollow rod extending circumferentially about the second rod and ball-bearings, the means for establishing the location of the first plane being mounted at the first end of the hollow rod and the means for determining the location of the equatorial plane being mounted at the second end of the hollow rod.

14. An apparatus for centering an annular tread on a casing as in claim 12, wherein the means for determining the location of the equatorial plane includes an off-center spring for use in locking the gears, the spring being attached to each of the gears.

15. An apparatus for centering an annular tread on a casing as in claim 14, wherein the means for establishing the location of the first plane includes a means for projecting light as a marking media.

16. An apparatus for centering an annular tread on a casing as in claim 15, further comprising:
a pair of rollers, each roller being connected to the second end of one of the arms, the distance between the end of an arm connected to a gear and the end connected to a roller being the same for each arm, the rollers selectively engaging the casing at points equidistant from the axis of rotation of the casing.

17. An apparatus for centering an annular tread on a casing as in claim 16 wherein the means for providing relative axial movement between the wheel and the tread expander assembly comprises a hydraulic cylinder, the stroke of the hydraulic cylinder being equal to the fixed axial distance.

* * * * *